(12) United States Patent
Ozawa et al.

(10) Patent No.: US 11,736,016 B2
(45) Date of Patent: Aug. 22, 2023

(54) SWITCHING CONVERTER WITH IMPROVED LOAD TRANSIENT RESPONSE AND METHOD OF OPERATING THE SAME

(71) Applicant: Dialog Semiconductor (UK) Limited, London (GB)

(72) Inventors: Seiichi Ozawa, Wakoh (JP); Keisuke Kadowaki, Toshima (JP)

(73) Assignee: Dialog Semiconductor (UK) Limited, London (GB)

( * ) Notice: Subject to any disclaimer, the term of this patent is extended or adjusted under 35 U.S.C. 154(b) by 0 days.

(21) Appl. No.: 17/411,319

(22) Filed: Aug. 25, 2021

(65) Prior Publication Data

US 2023/0063641 A1 Mar. 2, 2023

(51) Int. Cl.
*H02M 3/158* (2006.01)
*H02M 1/00* (2006.01)

(52) U.S. Cl.
CPC ........ *H02M 3/1586* (2021.05); *H02M 1/0009* (2021.05)

(58) Field of Classification Search
CPC ..... G05F 1/00; G05F 1/10; G05F 1/12; G05F 1/46; G05F 1/445; G05F 1/45; G05F 1/44; G05F 1/66; G05F 1/40; G05F 1/42; G05F 1/462; G05F 1/52; G05F 1/56; G05F 3/10; G05F 3/16; G05F 3/18; G05F 3/185; G05F 3/20; G05F 3/26; G05F 3/30; G05F 3/205; G05F 3/22; G05F 3/24; G05F 3/222; G05F 3/242; G05F 3/225; G05F 3/227; G05F 3/245; G05F 3/267; G05F 3/262; G05F 3/265; G05F 1/575; G05F 1/30; G05F 1/33; G05F 1/32; G05F 1/34; G05F 1/38; H02M 5/2573; H02M 1/081; H02M 5/293; H02M 7/12; H02M 3/10; H02M 3/125;
(Continued)

(56) References Cited

U.S. PATENT DOCUMENTS 4,199,728 A 4/1980 Carpenter
5,612,610 A * 3/1997 Borghi ................ H02M 3/1563
                                                323/287
(Continued)

FOREIGN PATENT DOCUMENTS

CN 110601695 A 12/2019
EP 1691473 A2 * 8/2006 .......... H02M 3/1584

OTHER PUBLICATIONS

German Office Action, File No. 10 2021 127 694.2, Applicant: Dialog Semiconductor (UK) Limited, dated May 5, 2022, 7 pages.
(Continued)

*Primary Examiner* — Thienvu V Tran
*Assistant Examiner* — Nusrat Quddus
(74) *Attorney, Agent, or Firm* — Saile Ackerman LLC; Stephen B. Ackerman

(57) ABSTRACT

A switching converter with improved load transient response is provided, including a panic comparator with a reset switch, a panic latch that is set by an output of the panic comparator and reset in conjunction with a strobe timing, and a timing generator which generates reset and strobe signals. The timing generator may include a gated oscillator, enabled by the panic latch. The panic comparator may include an HPF element, configured to accelerate the panic comparator response. The switching converter may be multi-phase.

29 Claims, 12 Drawing Sheets

(58) Field of Classification Search
CPC ........ H02M 3/13; H02M 3/135; H02M 3/145;
H02M 3/15; H02M 3/155; H02M 3/156;
H02M 3/158; H02M 3/1588; H02M
2003/1566; H02M 3/1582; H02M
2003/1557; H02M 3/22; H02M 1/08;
H02M 1/36; H02M 3/24; H02M 3/325;
H02M 3/335; H02M 3/28; H02M
3/33569; H02M 3/33507; H02M
2007/4815; H02M 2007/4818; H02M
1/083; H02M 3/33538; H02M 3/33546;
H02M 3/33515; H02M 3/33576; H02M
3/33592; H02M 3/33553; H02M 3/33523;
H02M 3/1584; H02M 3/285; H02M
3/33561; H02M 7/49; H02M 1/045;
H02M 7/006; H02M 7/06; H02M 7/068;
H02M 7/153; H02M 7/10; H02M 1/088;
H02M 7/103; H02M 7/106; H02M 7/19;
H02M 7/08; H02M 7/17; H02M
2001/007; H02M 7/493; H02M 7/53806;
H02M 7/5381; H02M 7/483; H02M
7/217; H02M 7/538466; H02M 7/5387;
H02M 7/53871; H02M 7/53873; H02M
7/53875; H02M 1/084; H02M 1/0845;
H02M 3/07; H02M 3/073; H02M
2003/071; H02M 2003/072; H02M
2003/075; H02M 2003/076; H02M
2003/077; H02M 2003/078; H02M
2001/0048; H02M 1/12; H02M 3/3155;
H02M 1/4208; H02M 7/219; H02M
7/151; H02M 1/4233; H02M 5/4585;
H02M 7/1552; H02M 7/1557; H02M
7/1623; H02M 7/1626; H02M 1/4225;
H02M 3/137; H02M 7/00; H02M 7/065;
H02M 7/064; H05B 39/048; H05B
2215/069; B23K 11/24; H02J 3/46; H02J
3/38; H02J 7/12; Y02B 70/1491; G01R
19/165; G01R 19/16509; G01R 19/16514;
G01R 19/16519; G01R 19/16523; G01R
19/16528; G01R 19/16533; G01R
19/16538; G01R 19/16542; G01R
19/16547; G01R 19/16552; G01R
19/16557; G01R 19/16561; G01R
19/16566; G01R 19/16571; G01R
19/16576; G01R 19/1658; G01R
19/16585; G01R 19/1659; G01R
19/16595; G01R 19/17
See application file for complete search history.

(56) References Cited

U.S. PATENT DOCUMENTS

| | | | |
|---|---|---|---|
| 6,191,630 B1 | 2/2001 | Ozawa | |
| 6,356,063 B1 | 3/2002 | Brooks | |
| 7,551,460 B2 | 6/2009 | Lalithambika | |
| 7,642,758 B2 | 1/2010 | Morong | |
| 7,656,141 B1 | 2/2010 | Granat | |
| 7,863,875 B1* | 1/2011 | Guo | H02M 3/1584 323/275 |
| 7,893,674 B2 | 2/2011 | Mok | |
| 8,164,391 B2 | 4/2012 | Huynh | |
| 8,169,802 B2 | 5/2012 | Kim | |
| 8,242,762 B2 | 8/2012 | Bhagwat | |
| 8,305,065 B2* | 11/2012 | Sase | H02M 3/156 323/283 |
| 8,330,437 B1* | 12/2012 | Hartman | H02M 3/1588 323/222 |
| 9,362,829 B2 | 6/2016 | Liu et al. | |
| 9,444,338 B1* | 9/2016 | Pastorina | G05F 1/10 |
| 9,627,976 B2 | 4/2017 | Li | |
| 9,755,519 B1* | 9/2017 | Huang | H03K 17/687 |
| 9,806,617 B1* | 10/2017 | Ozawa | H02M 3/1588 |
| 10,044,265 B1* | 8/2018 | Ozawa | H03F 3/195 |
| 10,122,272 B1* | 11/2018 | Nogawa | H02M 1/08 |
| 10,175,278 B1* | 1/2019 | Paduvalli | G01R 27/26 |
| 10,270,343 B2* | 4/2019 | Nguyen | H02M 3/1584 |
| 10,680,522 B2* | 6/2020 | Fukumoto | H02M 3/1588 |
| 2004/0070382 A1* | 4/2004 | Walters | H02M 3/1584 323/284 |
| 2004/0257055 A1 | 12/2004 | Aioanei | |
| 2006/0043943 A1* | 3/2006 | Huang | H02M 3/158 323/222 |
| 2007/0164720 A1 | 7/2007 | Lalithambika et al. | |
| 2009/0237058 A1 | 9/2009 | Mulligan | |
| 2010/0039836 A1 | 2/2010 | Gong | |
| 2010/0237844 A1* | 9/2010 | Yeh | H02M 3/156 323/284 |
| 2010/0315057 A1* | 12/2010 | Zambetti | H02M 3/158 323/284 |
| 2011/0025283 A1 | 2/2011 | Futamura | |
| 2011/0241642 A1 | 10/2011 | Xi | |
| 2012/0182003 A1* | 7/2012 | Flaibani | H02M 3/156 323/284 |
| 2012/0223691 A1 | 9/2012 | Weinstein et al. | |
| 2014/0159686 A1 | 6/2014 | Lee | |
| 2014/0232196 A1 | 8/2014 | Cameron | |
| 2014/0266123 A1* | 9/2014 | Rader | H02M 3/156 323/288 |
| 2014/0285172 A1 | 9/2014 | Teh | |
| 2014/0306680 A1 | 10/2014 | Liu | |
| 2015/0160669 A1* | 6/2015 | Marschalkowski | H02M 3/158 323/273 |
| 2015/0280556 A1* | 10/2015 | Bari | H02M 1/14 323/282 |
| 2015/0355242 A1 | 12/2015 | Ozawa | |
| 2016/0301303 A1* | 10/2016 | Bari | H02M 3/156 |
| 2016/0359414 A1 | 12/2016 | Ozanoglu | |
| 2017/0093278 A1 | 3/2017 | Unno | |
| 2017/0315578 A1* | 11/2017 | Lin | G05F 3/262 |
| 2017/0331373 A1* | 11/2017 | Huang | H02M 3/156 |
| 2018/0159549 A1 | 6/2018 | Martens et al. | |
| 2018/0191246 A1* | 7/2018 | Chen | H02M 3/156 |
| 2018/0342951 A1* | 11/2018 | Dias | H02M 3/156 |
| 2020/0266707 A1* | 8/2020 | Kong | H02M 3/158 |
| 2021/0376730 A1* | 12/2021 | Yan | H02M 3/1584 |

OTHER PUBLICATIONS

"DC-DC Converter With Digital Adaptive Slope Control in Auxiliary Phase for Optimal Transient Response and Improved Efficiency," by Yue Wen et al., IEEE Transactions on Power Electronics, vol. 27, No. 7, Jul. 2012, pp. 3396-3409.

U.S. Office Action, U.S. Appl. No. 15/260,379, Applicant: Ozawa et al., dated Apr. 18, 2017, 7 pages.

U.S. Notice of Allowance, U.S. Appl. No. 15/260,379, Applicant: Ozawa et al., dated Aug. 9, 2017, 22 pages.

* cited by examiner

SWITCHING CONVERTER WITH IMPROVED LOAD TRANSIENT RESPONSE AND METHOD OF OPERATING THE SAME

RELATED PATENT APPLICATIONS

This application is related to U.S. patent application Ser. No. 15/260,379, filed on Sep. 9, 2016, now issued as U.S. Pat. No. 9,806,617, issued on Oct. 31, 2017, assigned to the same assignee as the present disclosure, and incorporated herein by reference in its entirety.

FIELD

The present disclosure relates generally to a switching converter with improved load transient response, which may include a multi-phase implementation. More particularly, the disclosure relates to a panic comparator and method of operating.

BACKGROUND

One of the challenges for buck converters is to achieve a good load transient response. When the load current increases steeply and drastically, the device should compensate the lack of the output current as quickly as possible to avoid large undershoot of the output voltage. One of the solutions is having a so-called "panic" comparator in the device. If the comparator detects the excess output voltage drop, the device instantly forces the high side switching device "on".

FIG. 1 shows 100, one implementation of a switching converter having a panic comparator, known to the inventors. Output stage 110, PWM generator 120, and Error amp 130, comprise Main loop 140. It regulates Vout to the target voltage while the load current is stable. Panic comparator 150 is also shown, as part of subsidiary loop 160. It trips when the output voltage goes down below a predetermined threshold, which is lower than the target voltage. The output of the panic comparator is OR-ed with the PWM generator output and used as the on signal of the high side switching device and prevents large undershoot.

The output voltage of the switching converter is regulated to the target voltage defined by the reference Vref in FIG. 1. The threshold of the panic comparator is set slightly lower than the target voltage to avoid frequent reaction. There are two ways to generate the threshold. One way is to implement an offset to the differential input of the panic comparator. The voltage source 170 in FIG. 1 represents the implemented offset. Another way to generate the threshold is to generate the offset reference voltage using an amplifier, but this is not preferable because it requires additional blocks.

FIG. 2 shows 200, a timing chart of the switching converter of FIG. 1. When the output voltage 210 goes below the panic comparator threshold 215 due to rapid increase of the load current 240, the panic comparator 250 forces the high side switching device to turn on. The output current 230 continues to increase as far as the panic comparator is asserted.

But even after the output voltage reaches the panic comparator threshold, the output current is more than the load current because of delay in the panic comparator. As a result, the output current exceeds the load current. It causes large overshoot of the output voltage because it takes a certain time to reduce the output current and Vout continues to increase while the output current is larger than the load.

Eventually there is trade-off between undershoot voltage at load increase and overshoot after it. If the panic comparator threshold is lowered, the overshoot becomes smaller, but the undershoot larger. Both cannot be improved at the same time.

As depicted in FIG. 1, the panic comparator is modelled as a transconductance (gm) and buffer. There is a parasitic capacitance at the gm output. The transconductance translates voltage error between Vout and the panic comparator threshold vth_pnc into current.

FIG. 3 shows 300, an additional timing chart of the FIG. 1 switching converter. When output voltage Vout 310 goes below panic comparator threshold vth_pnc 315, the transconductance (gm) starts to charge capacitance of gmout 355. When gmout voltage reaches buffer threshold vth_buf 360, panic comparator output 350 is asserted.

When the panic comparator output 350 is asserted, the gmout voltage continues to go up and run away from the buffer threshold. When Vout goes up again and reaches vth_pnc, transconductance gm starts to discharge gmout. It takes some time to reset the panic comparator output, because the gmout voltage is far away from vth_buf and the change of gmout is low due to small voltage error. The gmout could be clamped, but the clamp's effect would be limited because the clamp voltage could not be close to the buffer threshold.

SUMMARY

Accordingly, it is an object of one or more embodiments of the present disclosure to provide a switching converter with improved load transient response, especially in a multi-phase implementation.

Further, it is an object of one or more embodiments of the disclosure to provide a panic comparator and method of operating the same, by negating the panic comparator output early to avoid a large overshoot after a panic reaction.

Still further, it is an object of one or more embodiments of the disclosure to reduce the delay of the panic comparator, and to reset the panic comparator output when the output voltage approaches a threshold.

Other objects will appear hereinafter.

The above and other objects of the present disclosure may be accomplished in the following manner. A switching converter with improved load transient response is provided, comprising a panic comparator, comprising a reset switch, a panic latch that is set by an output of the panic comparator and reset when the output is low at a strobe timing, and a timing generator which generates reset and strobe signals.

The above and other objects of the present disclosure may be further accomplished with a method of operating a switching converter with improved load transient response. The steps include providing a panic comparator, comprising a reset switch. The steps also include setting a panic latch with an output of the panic comparator and resetting the panic latch in conjunction with a strobe timing. The steps also include generating reset and strobe signals with a timing generator.

In various embodiments the timing generator is comprised of a gated oscillator (OSC), enabled by the panic latch.

In various embodiments the panic comparator comprises a High Pass Filter (HPF) element, configured to accelerate the panic comparator response.

In various embodiments the switching converter is multi-phase.

BRIEF DESCRIPTION OF THE DRAWINGS

The present disclosure will be more clearly understood from the following description taken in conjunction with the accompanying drawings in which like reference numerals designate similar or corresponding elements, regions and portions and in which.

DETAILED DESCRIPTION

The present disclosure proposes a switching converter with improved load transient response. A panic comparator and method of operating the same is achieved by setting the panic comparator output low early, and without delay, to avoid a large overshoot after a panic reaction. Not only is the delay of the panic comparator reduced, but the panic comparator output is also set low when the output voltage approaches a threshold.

Important features of the disclosure include a switching regulator with a panic comparator and its control, a reset switch connected to the critical or slowest node of the panic comparator, a panic latch which is set by the panic comparator output and reset when the panic comparator output is low at a strobe timing, and a timing generator which generates two signals as far as the latch is asserted. The two signals include a reset signal for the panic comparator and a strobe signal for the latch.

Optional features include a timing generator comprised of a gated oscillator, enabled by the panic latch. Additional optional features include a panic comparator comprised of an HPF element, to accelerate its response. The HPF element monitors [(Vout−Vthg)+τ*dVout/dt] rather than a simple voltage error: (Vout−Vtgt). Further, the HPF element can monitor [(Vout−Vtgt)+τ*dVout/dt] while the panic latch is low, and only monitors dVout/dt while the panic latch is high. Still further, the buck switching converter can be multi-phase.

Figure 1:
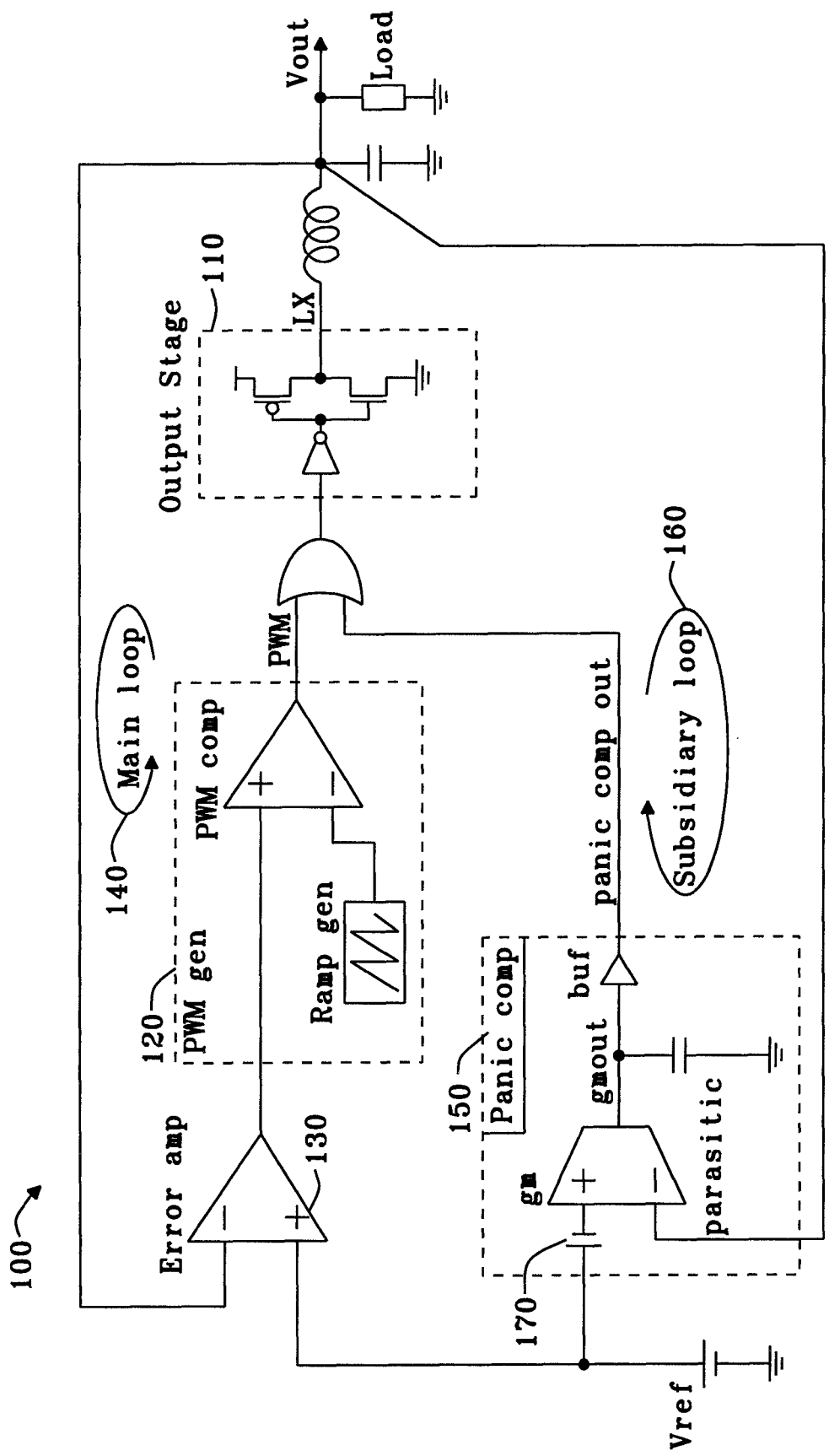
FIG. 1 shows one implementation of a switching converter having a panic comparator, known to the inventors.
Figure 4:
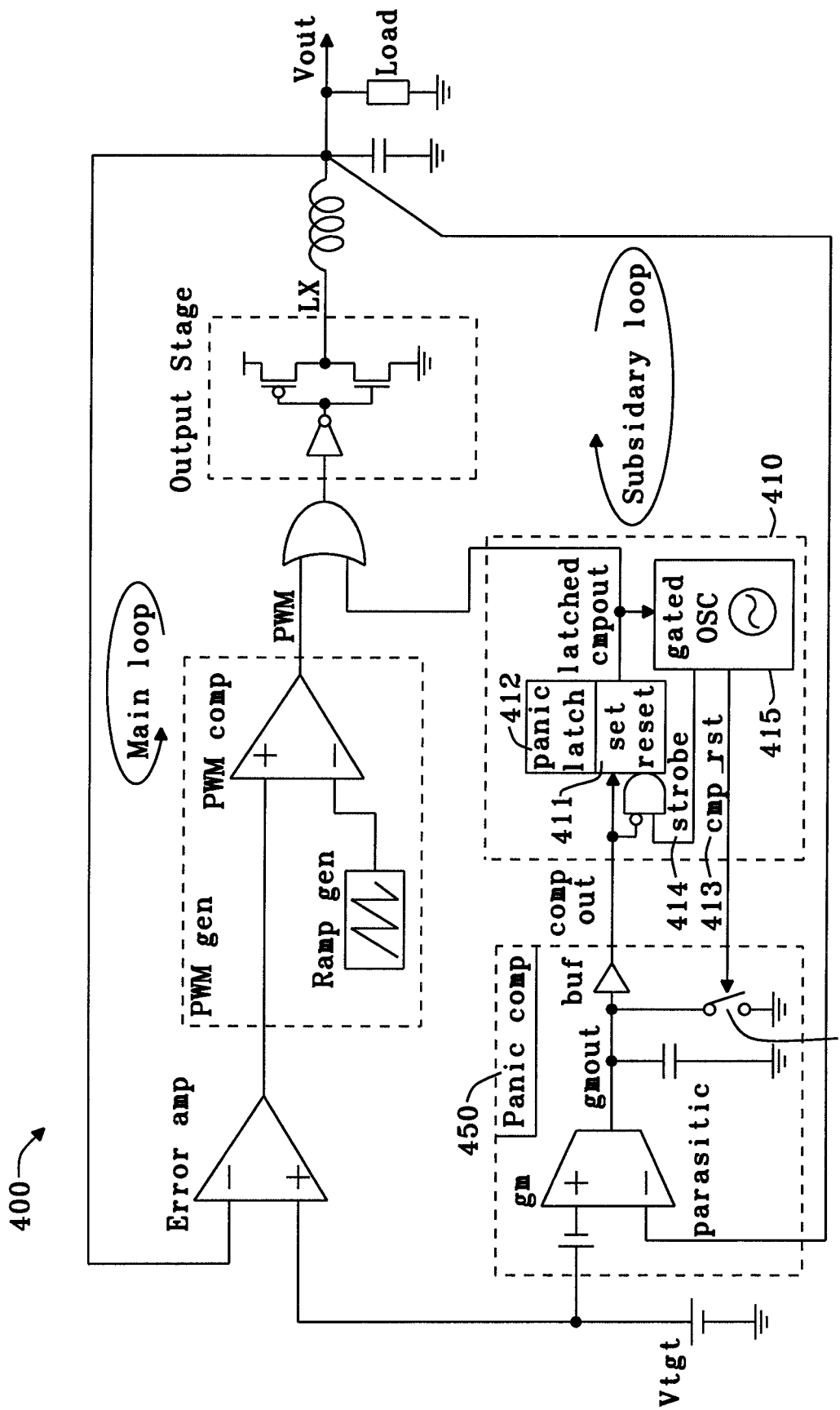
FIG. 4 shows a block diagram of the present disclosure, for a panic comparator and its control, for a single-phase switching converter.

FIG. 4 shows 400, a block diagram of the present disclosure, for a panic comparator and its control, for a single-phase switching converter. Differences from the prior art of FIG. 1 include Reset switch 416 added to panic comparator 450 and its control 410. The Reset switch is connected to gmout of the panic comparator and forces gmout to a reset level. Control of a panic state is composed of panic latch 412 and gated oscillator (OSC) 415 as a timing generator. The signal latched cmpout is used for forcing the high side switching device "on" instead of signal cmpout from the panic comparator. Gated OSC is activated when latched cmpout is asserted and generates strobe 414 and cmp_rst 413 signals periodically. Panic latch 412 has set and reset input signals as shown, based on cmpout and strobe signals. Further details are provided in FIG. 5A.

Figure 5A:
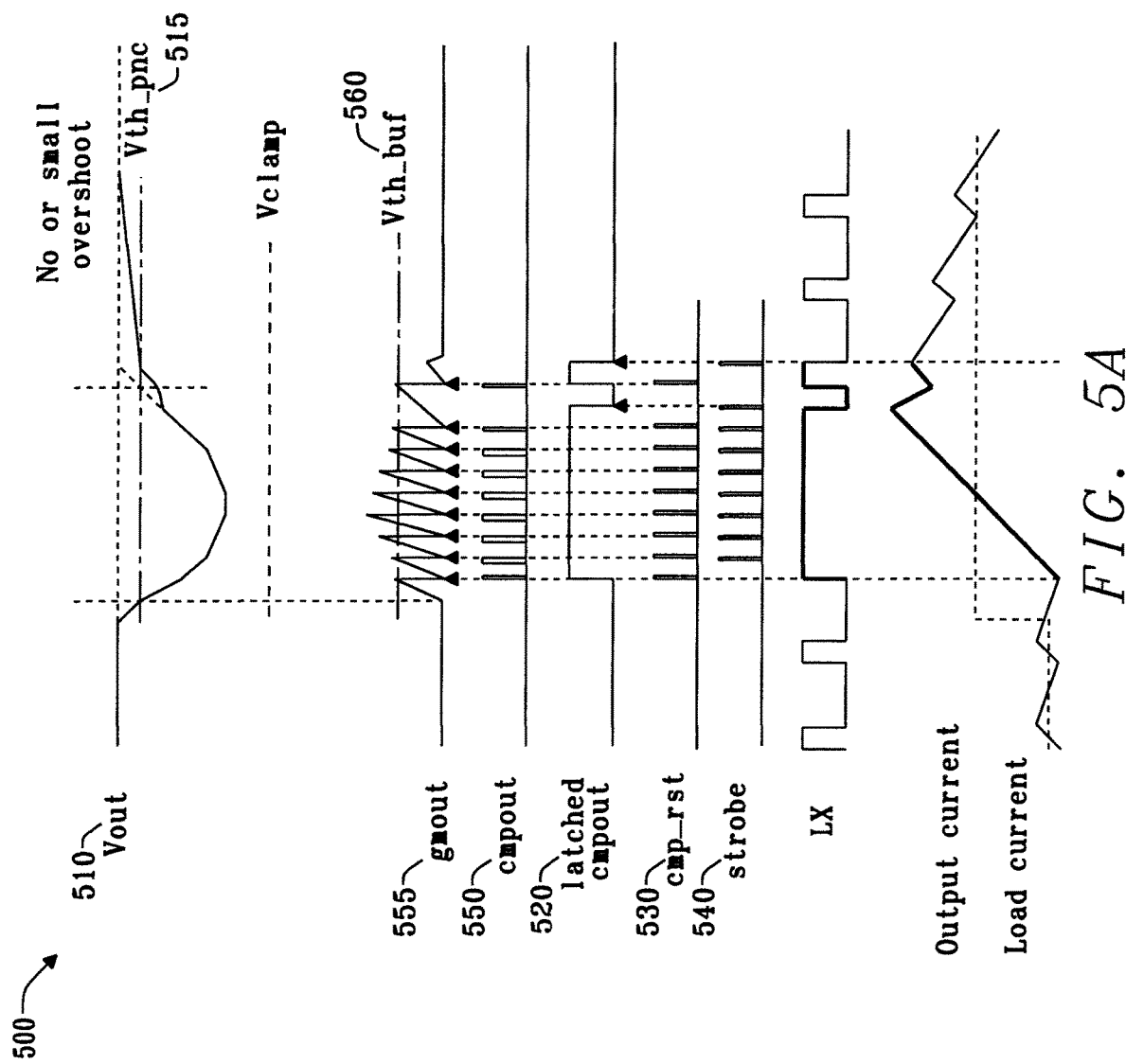
FIG. 5A shows a timing chart of the FIG. 4 switching converter.

FIG. 5A shows 500, a timing chart of the FIG. 4 switching converter. When output voltage Vout 510 goes below panic comparator threshold vth_pnc 515, panic comparator output cmpout 550 is asserted and panic latch 412 is set, as shown by signal latched cmpout 520. While the panic latch is asserted, the gated oscillator is enabled as the timing generator, on strobe 540. The timing generator generates very short pulses for panic comparator reset cmp_rst 530 immediately, and the voltage at gmout 555 is reset at each assertion of cmp_rst. Cmpout is reset accordingly. Cmp_rst is generated periodically, and when it is reset, gmout is charged up or down depending on the voltage error detected.

The gated oscillator generates the strobe signal 540 periodically. If cmpout 550 is low at the strobe timing, the panic latch 520 is reset. If cmpout is high at the strobe timing, the panic latch is kept high. Polarity of cmpout at the strobe timing depends on the voltage error from vth_pnc 515. If Vout 510 is far below vth_pnc, gmout 555 is charged up quickly after reset, and cmpout is high at the strobe timing. If the voltage error is small, gmout cannot reach buffer threshold vth_buf 560 and cmpout is low. Thus, the panic latch is reset when Vout approaches panic threshold, vth_pnc.

Strobe signal 540 preferably starts a cycle after panic comparator reset cmp_rst 530. The strobe is kept for a cycle after cmp_rst, because the panic comparator output does not reflect the actual voltage error during that period. Even if Vout is lower than the panic comparator threshold, vth_pnc 515, it takes some time for gmout 555 to reach Vth_buf 560. As depicted in FIG. 4, strobe signal 414 is used for masking cmpout. When strobe signal 414 is high, panic latch 412 is reset by cmpout=L. While strobe signal 414 is low, panic latch 412 cannot be reset.

Latched cmpout 520 goes down, then back up, then back down again, towards the end of FIG. 5A because while latched cmpout 520 is high, it can be reset only when strobe signal is high and cmpout is low. Latched cmpout 520 is kept high because cmpout 550 is high for the $1^{st}$ to $7^{th}$ pulses of strobe signal 540. At the $8^{th}$ pulse, latched cmpout 520 is reset because cmpout 550 is low at that timing. While latched cmpout 520 is low, gmout gradually rises as Vout is slightly lower than Vth_pnc. When gmout reaches Vth_buf, cmpout 550 is asserted and it sets latched cmpout 520 again. After a cycle, the $9^{th}$ pulse of strobe signal 540 is generated. Latched cmpout 520 is reset at that timing because Vout is above Vth_pnc and cmpout 550 is not high.

Figure 5B:
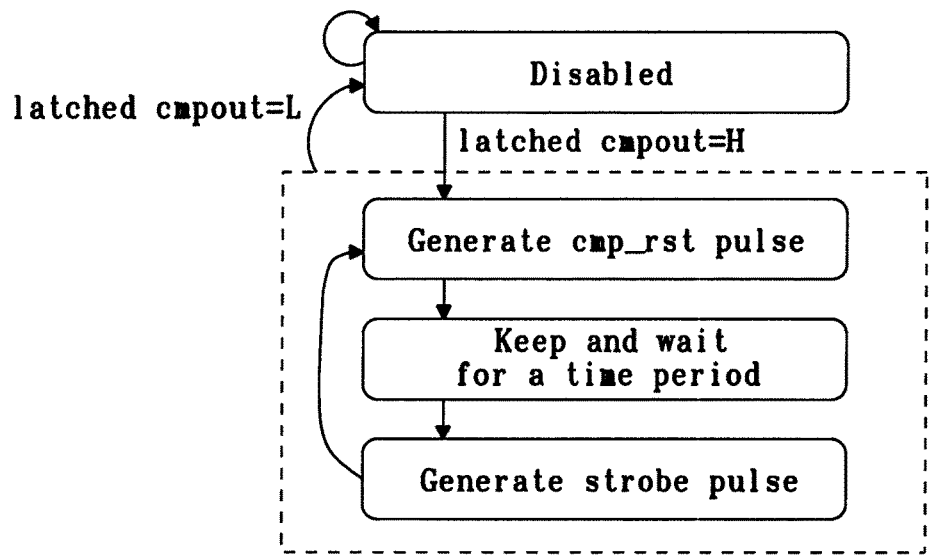
FIGS. 5B and 5C show state diagrams of the gated oscillator (OSC) and panic control of FIG. 4.
Figure 5C:
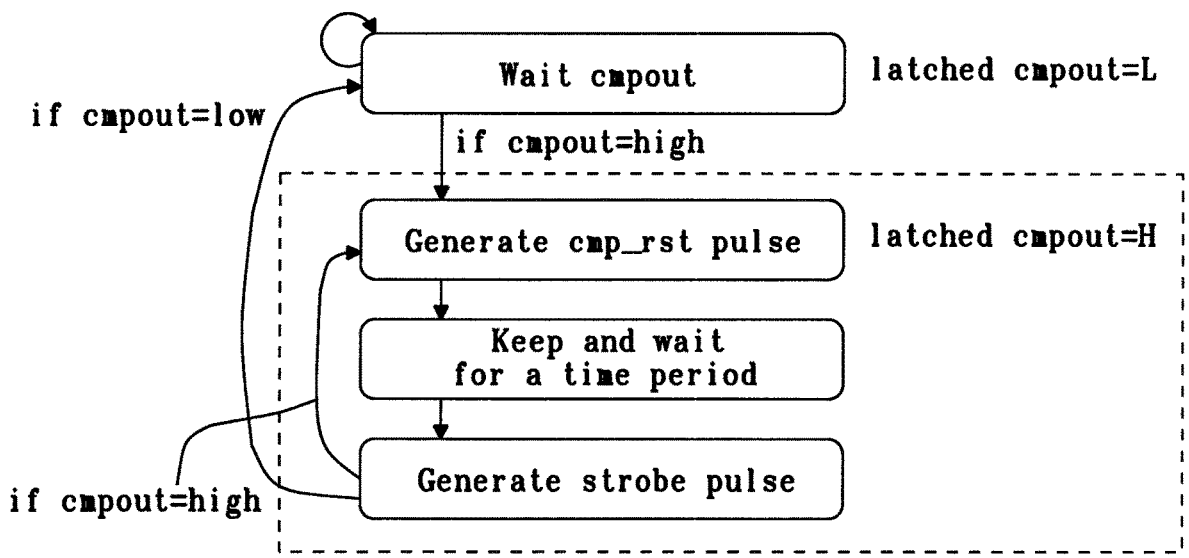

FIGS. 5B and 5C show state diagrams of the gated oscillator (OSC) and panic control of FIG. 4. FIGS. 5B and 5C show the relationship between latched_cmpout as an input, and cmp_rst and strobe as outputs of the gated OSC. While latched cmpout is low, the gated OSC is disabled. When latched cmpout is asserted, the sequence is started and maintained while the latched cmpout is high. First, the cmp_rst pulse is generated, and there is a delay of a time period, dozens of nanoseconds, for example. Then the gated OSC generates the strobe pulse and returns the cmp_rst pulse again. Together with the panic latch 412, the gated OSC functions as the panic control 410 in FIG. 4.

Figure 2:
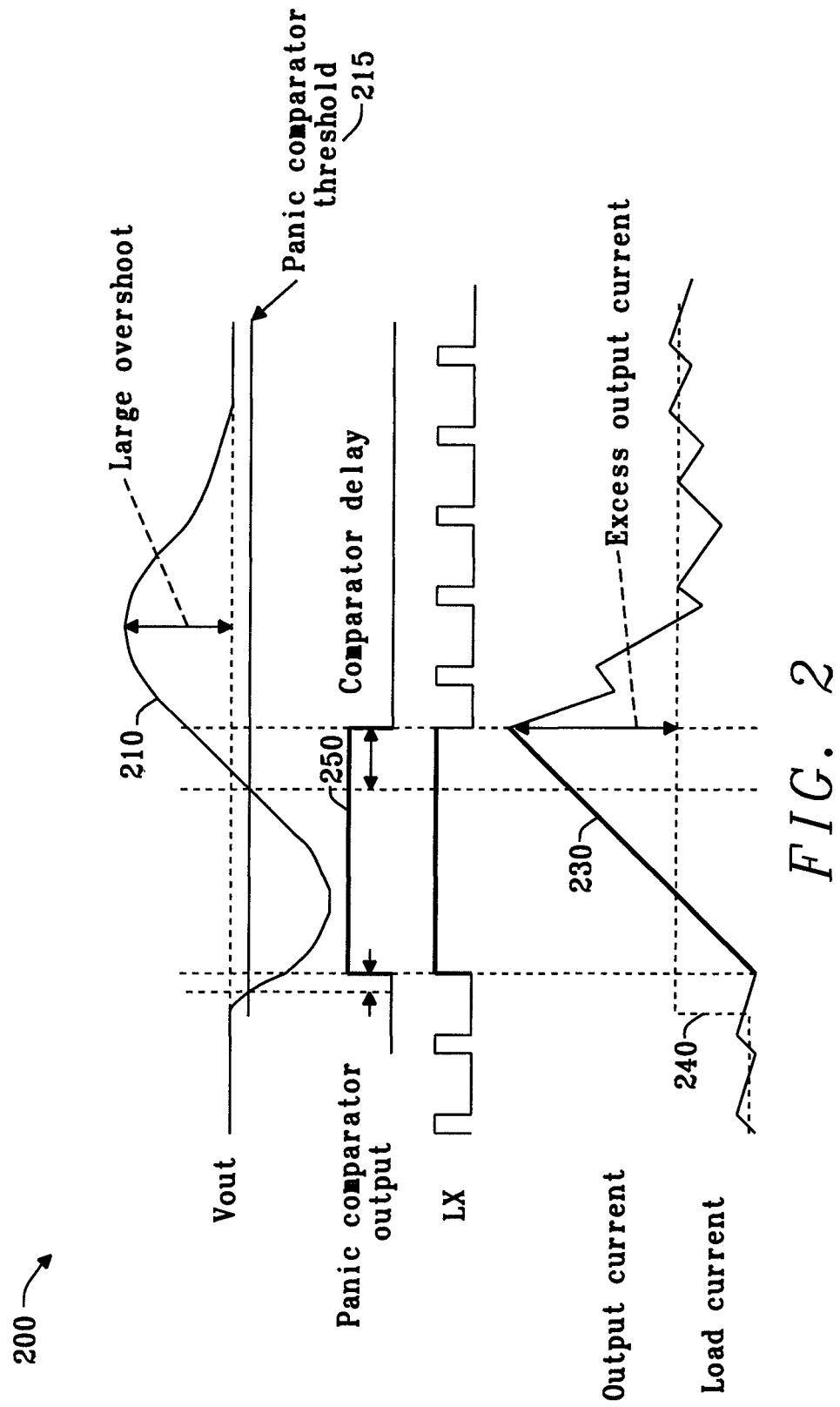
FIG. 2 shows a timing chart of the switching converter of FIG. 1, when an output voltage goes below a panic comparator threshold.

In FIG. 2, pncout 250 is asserted longer than ideal due to the delay of a panic comparator of the prior art. This is avoided in the disclosed switching converter of FIG. 4, where the unwanted delay on the falling edge has been removed. This is best understood by modelling the panic comparator with a transconductance (gm) and buffer. Gm translates the voltage error between the Vout and Vth_pnc outputs into a current, and the gm output current is stored in the parasitic capacitance of gmout. When gmout voltage hits threshold Vth_buf voltage, the panic comparator of the present disclosure changes its output polarity.

Figure 3:
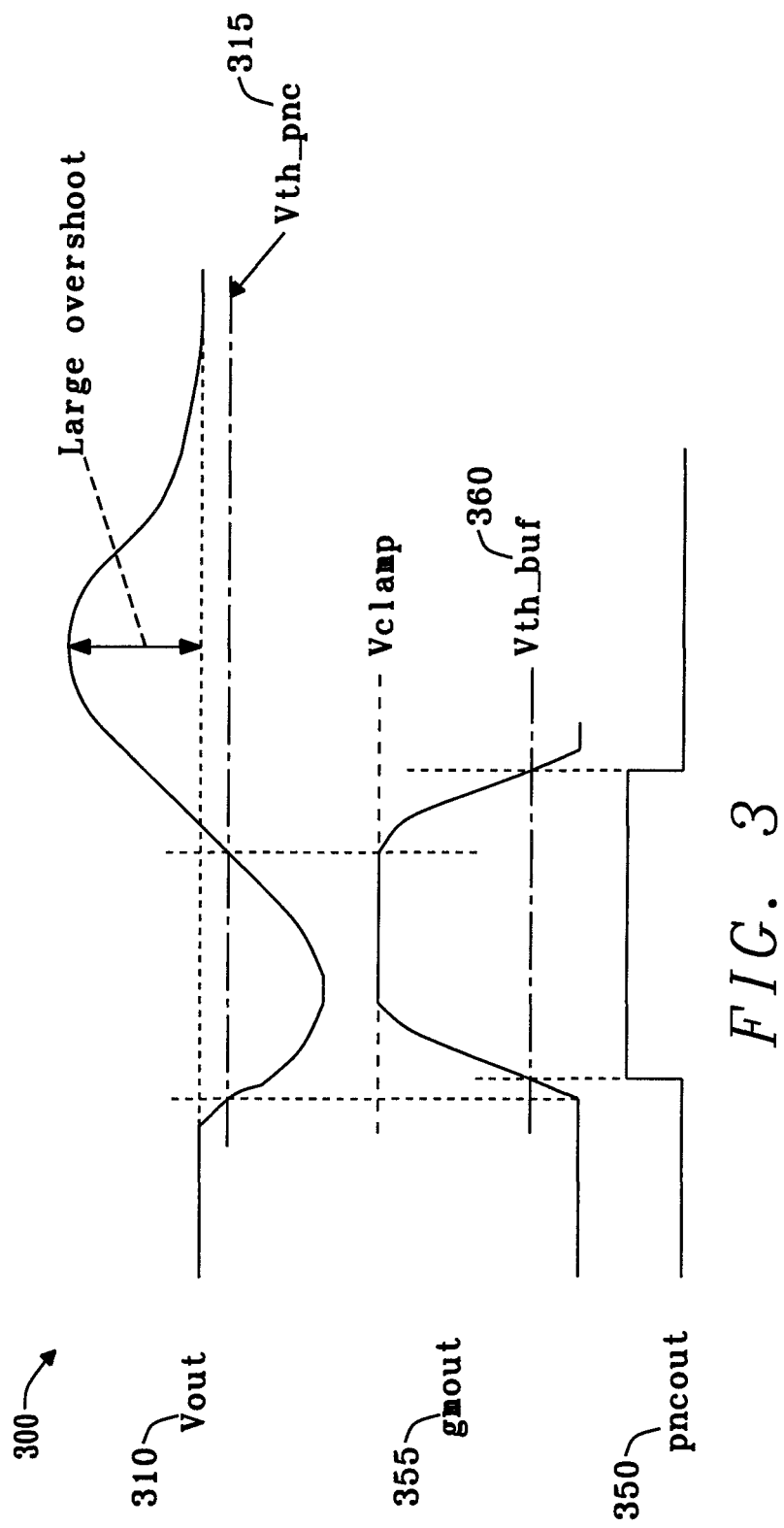
FIG. 3 shows an additional timing chart of the FIG. 1 switching converter, when a transconductance starts to charge the parasitic capacitance.

In FIG. 3, pncout 350 should ideally be reset when Vout reaches vthn_pnc. Since excessive charge is stored in the parasitic capacitance of gmout while Vout is lower than vth_pnc, the gmout voltage is far from vth_buf at that timing. As a result, it takes longer to discharge the gmput voltage to vth_buf, causing the delay.

With the implementation of the present disclosure, resetting of the panic latch is judged at the strobe timing. Since the parasitic capacitance of gmout is reset at the beginning of every cycle, the panic latch reset is not affected as much by excessive charge. Delay due to the gated OSC cycle can be ignored by setting the cycle short enough.

Figure 6A:
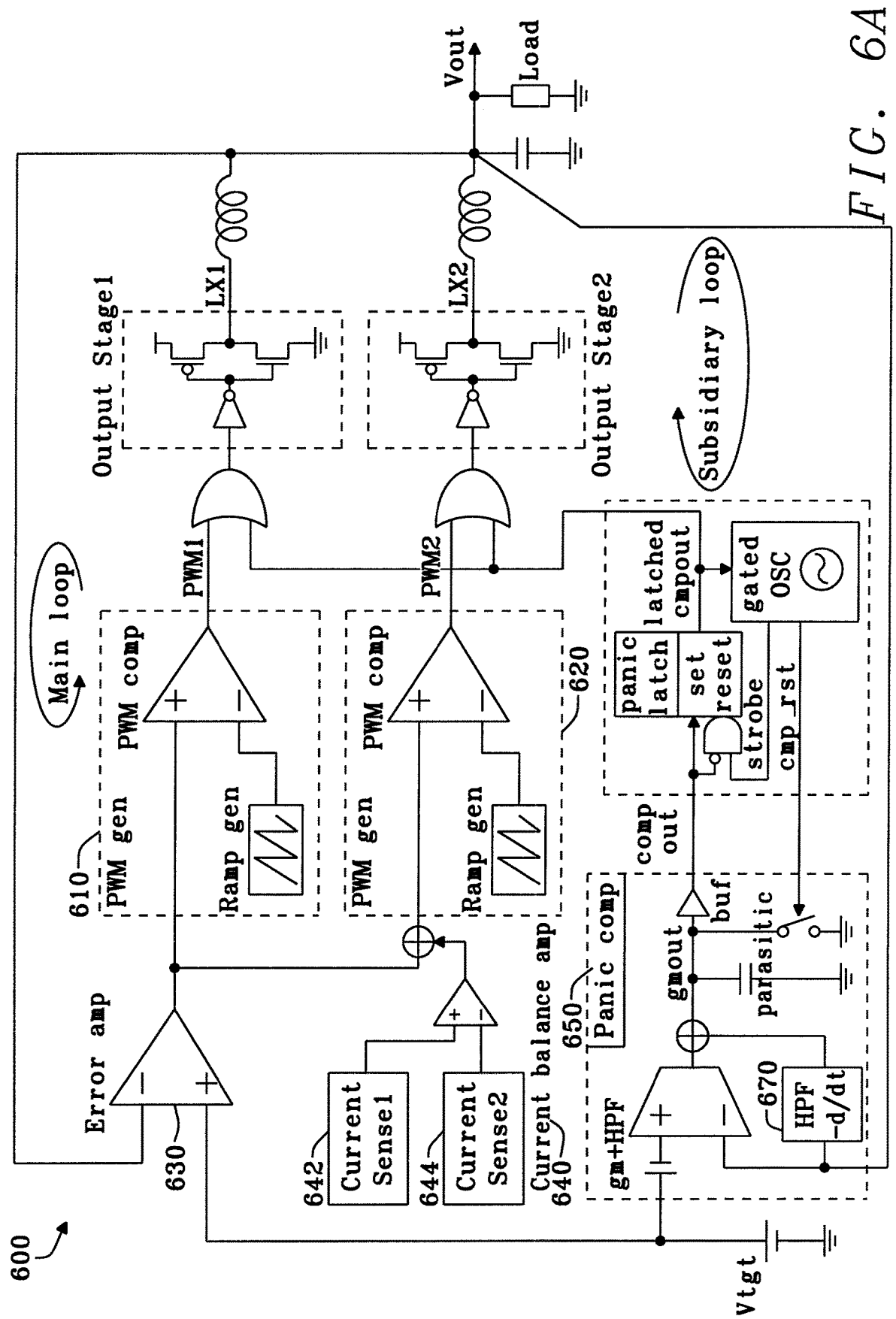
FIG. 6A shows a block diagram of the present disclosure, for a panic comparator and its control, for a multi-phase buck switching converter.

FIG. 6A shows 600, a block diagram of the present disclosure, for a panic comparator and its control, for a multi-phase buck switching converter. There are two phases PWM1 from PWM generator 610 and PWM2 from PWM generator 620, and their output duty cycles are controlled by the same error amplifier 630. To balance the output currents of both phases, current balance amp 640 is added. The current balance amp compares the sensed output currents of the phases, current sense1 642 and current sense2 644, and adjusts the error amplifier output for the second phase. One way to measure the sensed output currents is to check the voltage drop across the switching devices of the output stages. In this case, the currents are sensed from the voltage drop across the low side devices while they are turned on.

The panic comparator and its control are implemented as in FIG. 4. When the panic latch is asserted, the high side devices of both phases are turned on, and the output currents are increased. In this example, optional HPF element 670 is added to panic comparator 650, adding a differential component to voltage of gmout. The HPF element improves the response further, because the panic comparator can anticipate Vout as a first order Taylor expansion given below:

$$Vout(t+\tau) \sim Vout + \tau * dVout/dt$$

Figure 6B:
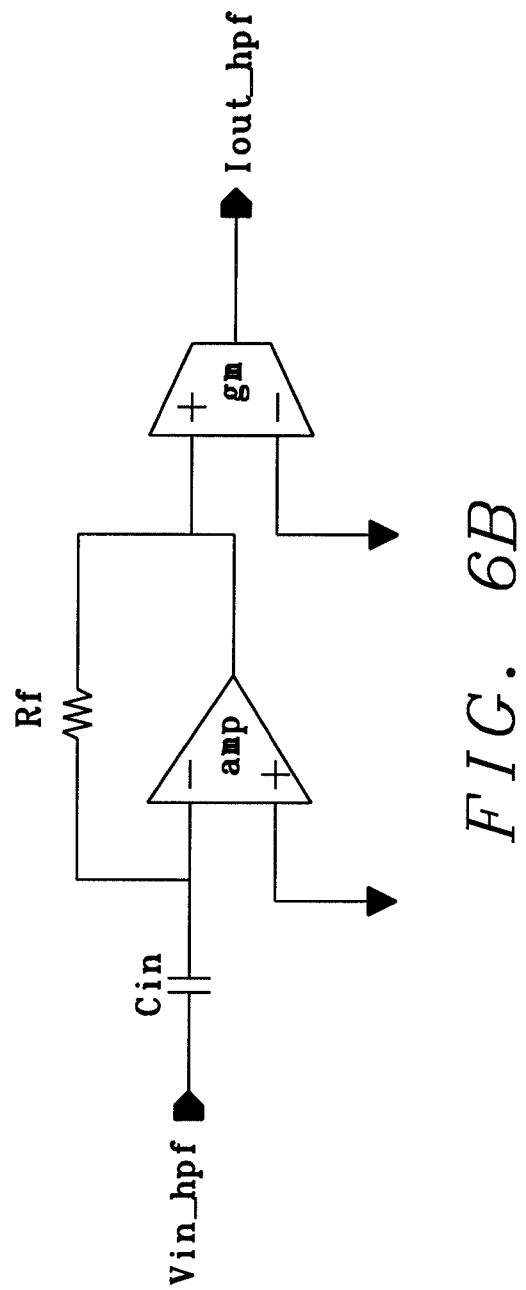
FIG. 6B shows a circuit diagram of the High Pass Filter (HPF) element, for a panic comparator of FIG. 6A.

FIG. 6B shows a circuit diagram of the High Pass Filter (HPF) element, for the panic comparator of FIG. 6A. The HPF element extracts the differential component of Vout, and the output current, Iout_hpf, can be expressed as:

$$Iout\_hpf = -gm * Rf * Cin * d/dt(Vin\_hpf)$$

Figure 6C:
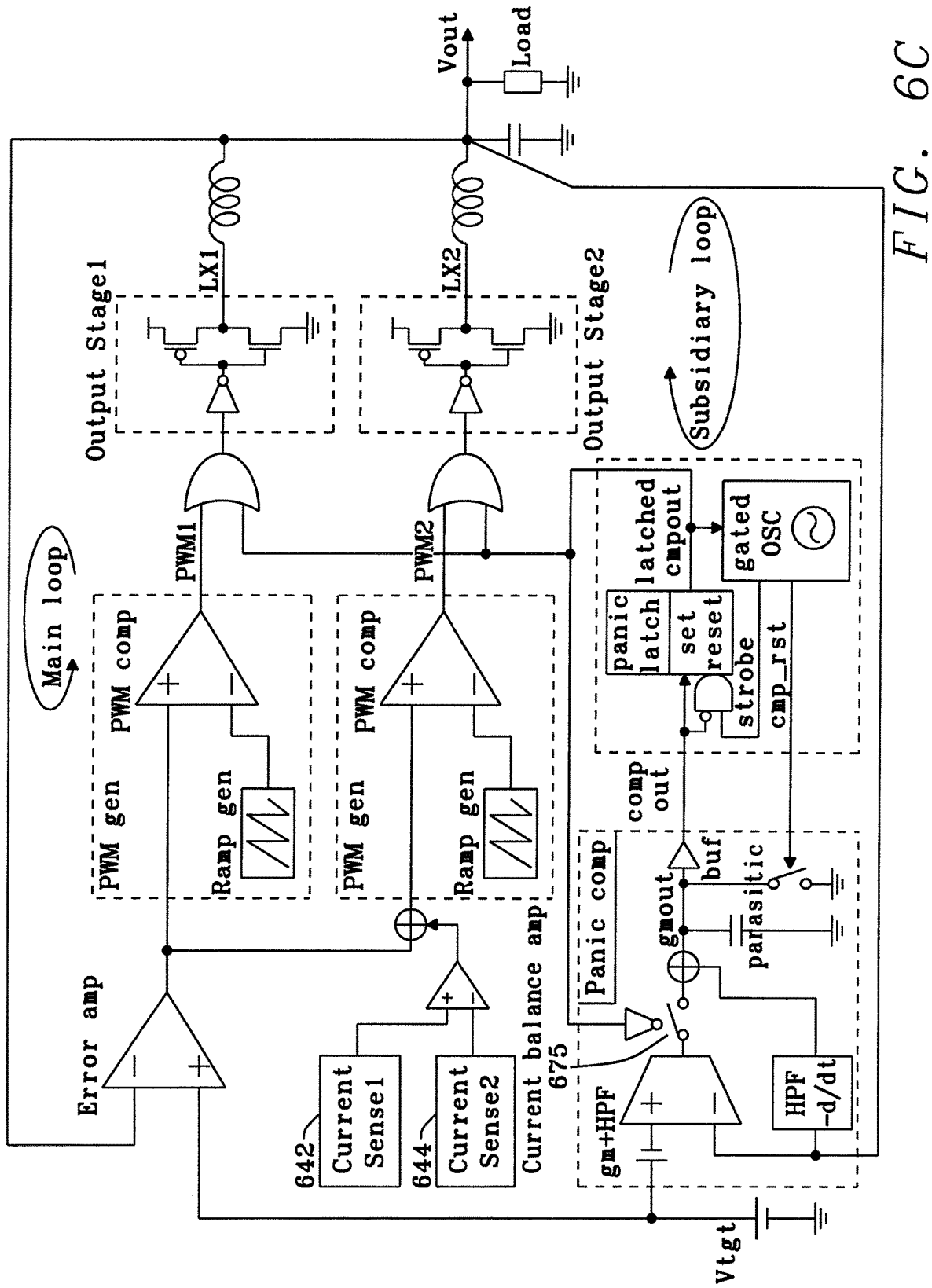
FIG. 6C shows the monitoring of only dVout/dt, when the panic latch is asserted.

Another option is to only monitor dVout/dt when the panic latch is asserted, as shown in FIG. 6C. Here, Gm is disconnected with switch 675, when latched cmpout is asserted. If the panic latch is asserted for too long of time, the inductor current would exceed the load current by too much. Since dVout/dt is proportional to the excess output current, this condition can be prevented by only monitoring dVout/dt. This particular concept is described in related to U.S. patent application Ser. No. 15/260,379, filed on Sep. 9, 2016, now issued as U.S. Pat. No. 9,806,617, issued on Oct. 31, 2017.

Figures 7A, 7B:
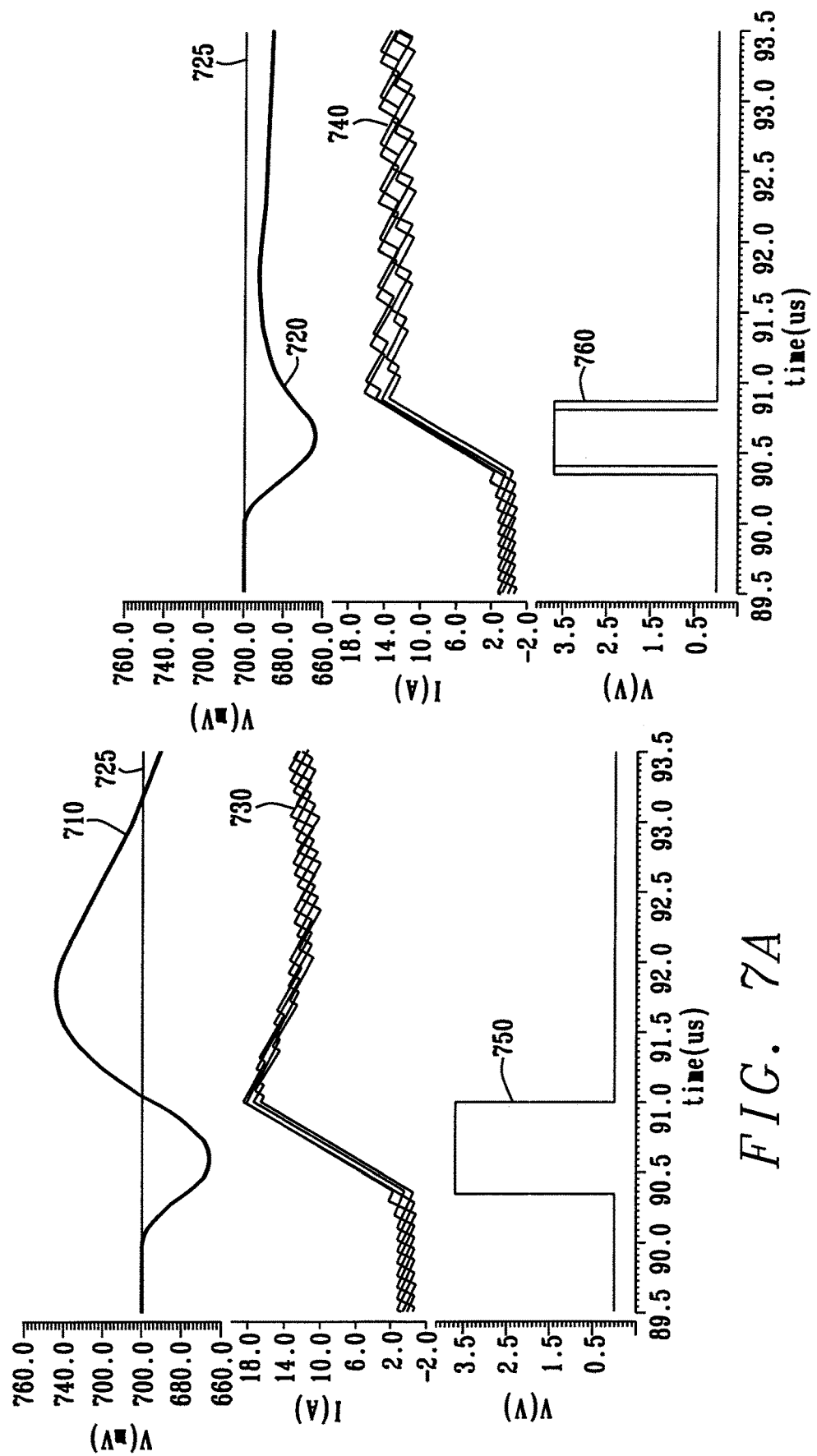
FIGS. 7A and 7B show simulation results comparing output voltage, inductor current, and the panic comparator output, with and without the FIG. 6 switching converter, configured for four phases.

FIGS. 7A and 7B show simulation results comparing output voltage, inductor current, and the panic comparator output, with and without the circuitry of the FIG. 6 switching converter. The simulation results were based on a four-phase buck switching converter.

The 710 and 720 waveforms show the output voltages of the switching converters. The 710 signal is the waveform of the prior art, using the circuit of FIG. 1, in a four-phase configuration. The 720 signal is the waveform of the disclosure, using the circuit of FIG. 6, in a four-phase configuration. Dotted line 725 represents the reference voltage, to which the output voltages are regulated. The output voltage 720, with the present disclosure panic comparator and its controls, has less overshoot than the output voltage 710 of the prior art.

The 730 and 740 waveforms show the output/inductor currents of the switching converters. The 730 signal is the waveform of prior art, and 740 signal is the waveform of the disclosure. There are four signals of each, representing the four-phase buck switching converter outputs. When it is more than the output current, the output voltage of the present disclosure drops. When the output current matches the output voltage, the output voltage is stable. Here, a steep load change is applied, and the output currents are increased to follow the load current.

The 750 and 760 waveforms show the panic comparator outputs of the switching converters. The 750 signal is the waveform of the prior art and represents the direct output of the panic comparator. The 760 signal is the waveform of the disclosure and represents the latched panic comparator output. When the output voltage drops, the 760 signal is asserted. As long as the 760 signal remains high, the high side devices of the four phases of the buck switching converter are forced on, and their output currents continue to increase. In the prior art, the panic comparator output stays high after the output currents reach the load current, and even after the output voltage exceeds the reference voltage. This results in excess output current and causes a large overshoot of the output voltage. In the disclosure, the panic comparator output is stopped faster, and overshoot is prevented. When the output voltage error is small, latched cmpout becomes a short pulse from a continuous long pulse. It is a softer response than the prior art, and preferable for avoiding overshoot of the output voltage.

Figure 8:
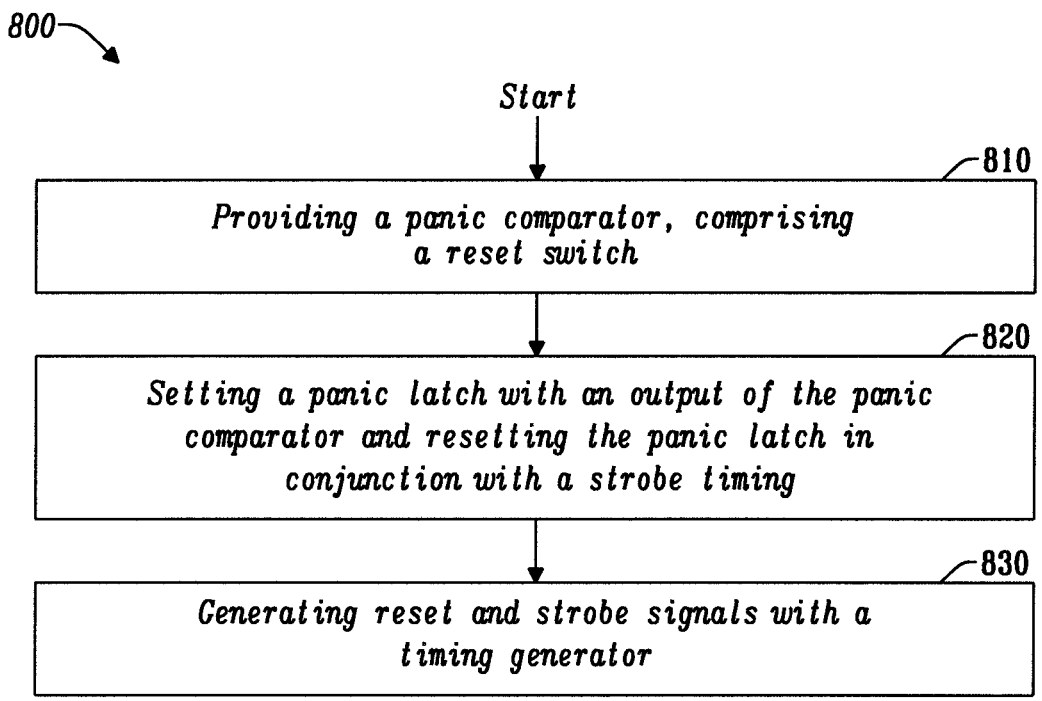
FIG. 8 is a flow chart of a method for operation of the disclosed switching converter.

FIG. 8 is flow chart 800, of a method for operation of the disclosed switching converter. The steps include 810, providing a panic comparator, comprising a reset switch. The steps also include 820, setting a panic latch with an output of the panic comparator and resetting the panic latch in conjunction with a strobe timing. The steps also include 830, generating reset and strobe signals with a timing generator.

Figure 9:
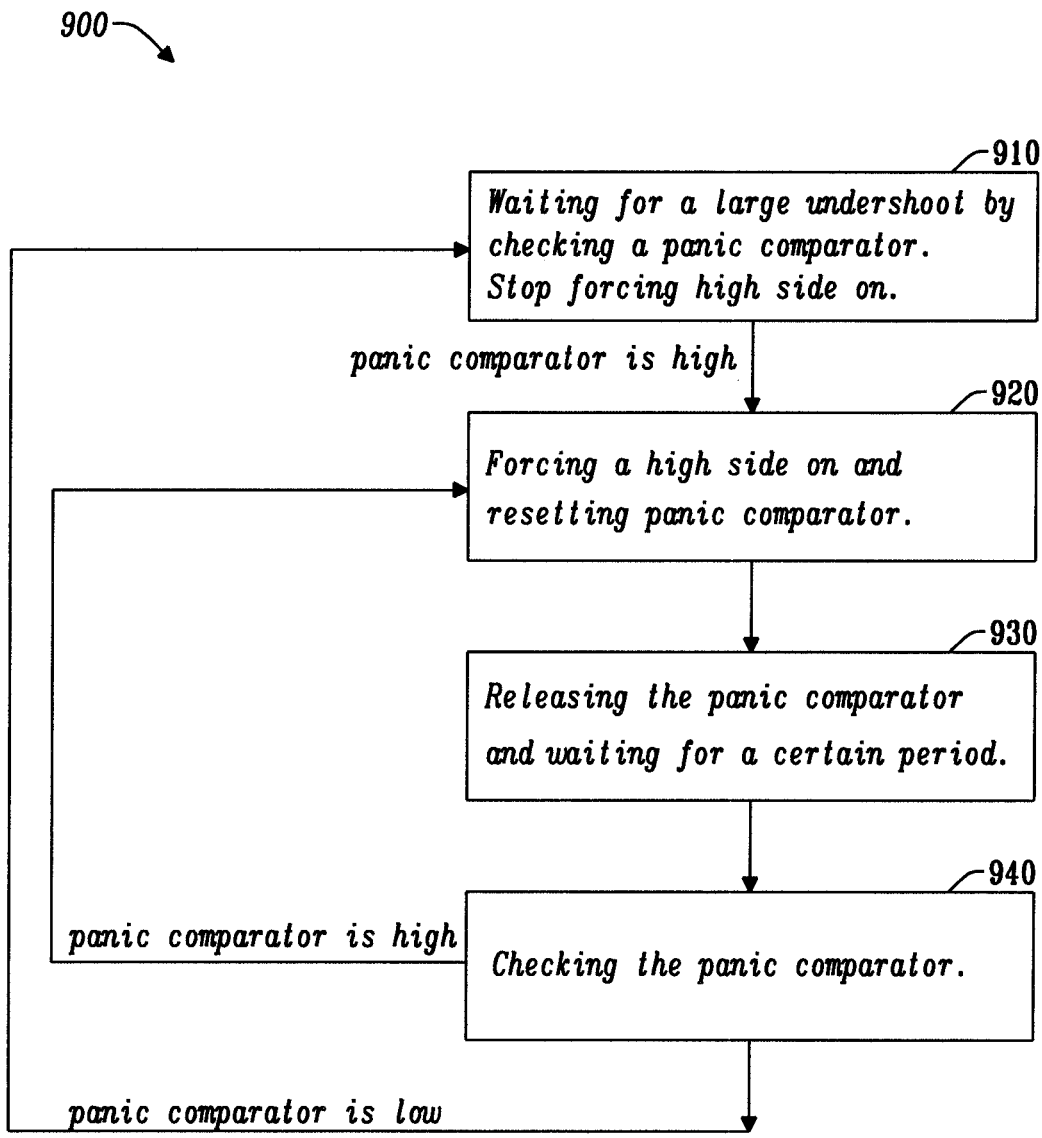
FIG. 9 is a flow chart providing details of a method for operation of the disclosed switching converter.

FIG. 9 is flow chart 900, providing details of a method for operation of the disclosed switching converter. The steps include 910, waiting for a large undershoot in the switching converter by checking the panic comparator, and 920 when the panic comparator is high, forcing a high side device on, and resetting the panic comparator. The steps also include 930, releasing the panic comparator and waiting a time and 940, checking the panic comparator again. If the panic comparator is high, forcing a high side device on, and resetting the panic comparator. If the panic comparator is low, return to waiting for a large undershoot in the switching converter by checking the panic comparator.

The main advantage of one or more embodiments of the present disclosure include a switching converter with an improved load transient response, especially in a multi-phase implementation. The panic comparator is most effective for a buck switching converter with a small inductor on its output. With multi-phases and multiple inductors, all the phases are turned on if the panic pulse is asserted. Since the overall effective inductance is small, rapid control of the panic pulse may be achieved.

While particular embodiments of the present disclosure have been illustrated and described, it will be understood by those skilled in the art that various changes in form and details may be made without departing from the spirit and scope of the invention.

What is claimed is:

1. A switching converter with improved load transient response, comprising:
    a panic comparator, comprising a reset switch, a transconductance amplifier, and a buffer, wherein the reset switch is connected to an output of the transconductance amplifier;
    a panic latch that is set by an output of the panic comparator, and reset in conjunction with a strobe timing; and
    a timing generator which generates reset timing and strobe timing,
    wherein an output voltage of the switching converter going below a panic comparator threshold triggers the panic comparator output to be asserted and the panic latch to be set, forcing a high side switching device on.

2. The switching converter of claim 1, wherein the panic latch is configured to reset in conjunction with the strobe timing.

3. The switching converter of claim 1, wherein a high side device is configured to increase its output current, when the panic latch is set.

4. The switching converter of claim 1, wherein the panic latch and timing generator form a panic comparator control, which drives an output stage of the switching converter.

5. The switching converter of claim 1, wherein the panic comparator output is buffered.

6. The switching converter of claim 1, wherein the timing generator comprises a gated oscillator (OSC), enabled by the panic latch.

7. The switching converter of claim 1, wherein the panic comparator comprises an High Pass Filter (HPF) element, configured to accelerate a panic comparator response.

8. The switching converter of claim 7, wherein the HPF element is configured to monitor [(Vout−Vtgt)+τ*dVout/dt] while the panic latch is low, and to monitor dVout/dt while the panic latch is high,
    where Vout is an output voltage, Vtgt is a target voltage, τ is a linear constant, and dVout/dt is a change in the output voltage with respect to time.

9. The switching converter of claim 1, wherein the switching converter is multi-phase.

10. A method of operating a switching converter,
    wherein the switching converter comprises a panic comparator comprising a transconductance amplifier, a buffer, and a reset switch connects to an output of the transconductance amplifier,
    wherein an output voltage of the switching converter going below a panic comparator threshold triggers the panic comparator output to be asserted and a panic latch to be set, forcing a high side switching device on, and
    wherein the method comprises the steps of:
        waiting for a large undershoot in the switching converter by checking the panic comparator, and when the panic comparator is high, forcing a high side device on, and resetting the panic comparator;
        releasing the panic comparator and waiting a time to check the panic comparator again;
        forcing a high side device on, and resetting the panic comparator, when the panic comparator is high; and
        returning to waiting for a large undershoot in the switching converter by checking the panic comparator, when the panic comparator is low.

11. The method of claim 10, wherein a panic latch resets in conjunction with a strobe timing.

12. The method of claim 10, wherein a high side device increases its output current, when a panic latch is set.

13. The method of claim 10, wherein a panic latch and timing generator form a panic comparator control, which drives an output stage of the switching converter.

14. The method of claim 10, wherein the panic comparator output is buffered.

15. The method of claim 10, wherein a timing generator comprises a gated oscillator (OSC), enabled by a panic latch.

16. The method of claim 10, wherein the panic comparator comprises a High Pass Filter (HPF) element, and accelerates a panic comparator response.

17. The method of claim 16, wherein the HPF element monitors [(Vout−Vtgt)+τ*dVout/dt] while the panic latch is low, and monitors dVout/dt while the panic latch is high, where Vout is an output voltage, Vtgt is a target voltage, τ is a linear constant, and dVout/dt is a change in the output voltage with respect to time.

18. The method of claim 10, wherein the switching converter is multi-phase.

19. The method of claim 18, wherein high side devices of all phases are configured to increase their output current, when the panic latch is set.

20. A method of operating a switching converter with improved load transient response,
    wherein the switching converter comprises a panic comparator comprising a transconductance amplifier, a buffer, and a reset switch connected to an output of the transconductance amplifier,
    wherein an output voltage of the switching converter going below a panic comparator threshold triggers the panic comparator output to be asserted and a panic latch to be set, forcing a high side switching device on, and
    wherein the method comprises the steps of:
        waiting for a large undershoot in the switching converter, by checking a panic comparator;
        forcing a high side device on, and resetting the panic comparator, when the panic comparator is high;
        releasing the panic comparator and waiting a time to check the panic comparator again;
        returning to forcing a high side device on, and resetting the panic comparator, when the panic comparator is high; and
        returning to waiting for a large undershoot in the switching converter, by checking the panic comparator, when the panic comparator is low.

21. The method of claim 20, wherein a panic latch resets in conjunction with a strobe timing.

22. The method of claim 21, wherein a high side device increases its output current, when the panic latch is set.

23. The method of claim 21, wherein the panic latch and a timing generator form a panic comparator control, which drives an output stage of the switching converter.

24. The method of claim 20, wherein the panic comparator output is buffered.

25. The method of claim 23, wherein the timing generator comprises a gated oscillator (OSC), enabled by the panic latch.

26. The method of claim 20, wherein the panic comparator comprises a High Pass Filter (HPF) element, and accelerates a panic comparator response.

27. The method of claim 26, wherein the HPF element monitors [(Vout−Vtgt)+τ*dVout/dt] while the panic latch is low, and monitors dVout/dt while the panic latch is high, where Vout is an output voltage, Vtgt is a target voltage, τ is a linear constant, and dVout/dt is a change in the output voltage with respect to time.

28. The method of claim 20, wherein the switching converter is multi-phase.

29. The method of claim 28, wherein high side devices of all phases are configured to increase their output current, when the panic latch is set.

* * * * *